Oct. 10, 1950          M. C. POYLO          2,524,832
PULSE-TIME TELEMETERING SYSTEM
Filed April 6, 1946
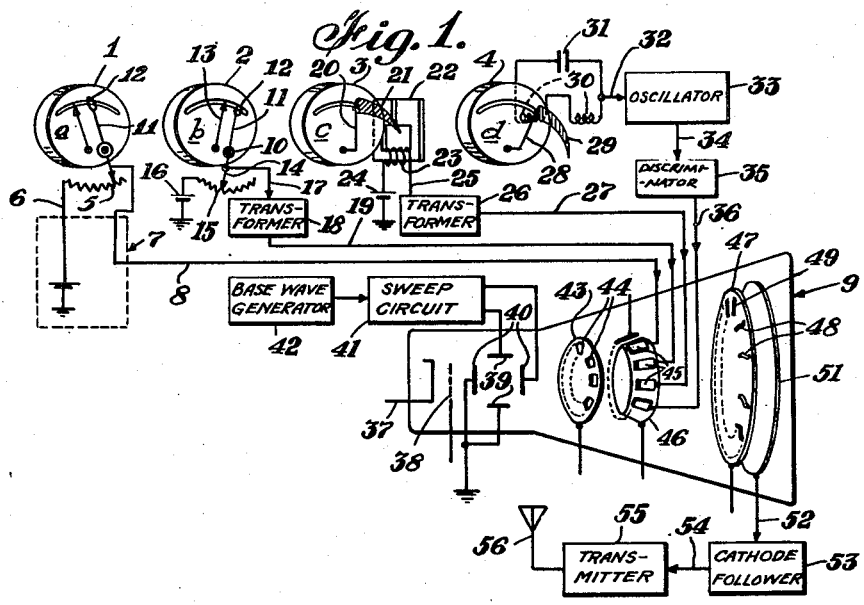
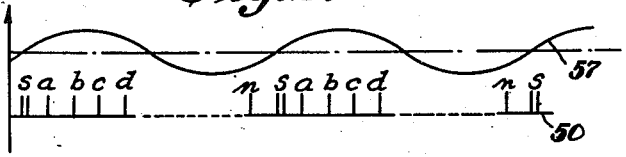
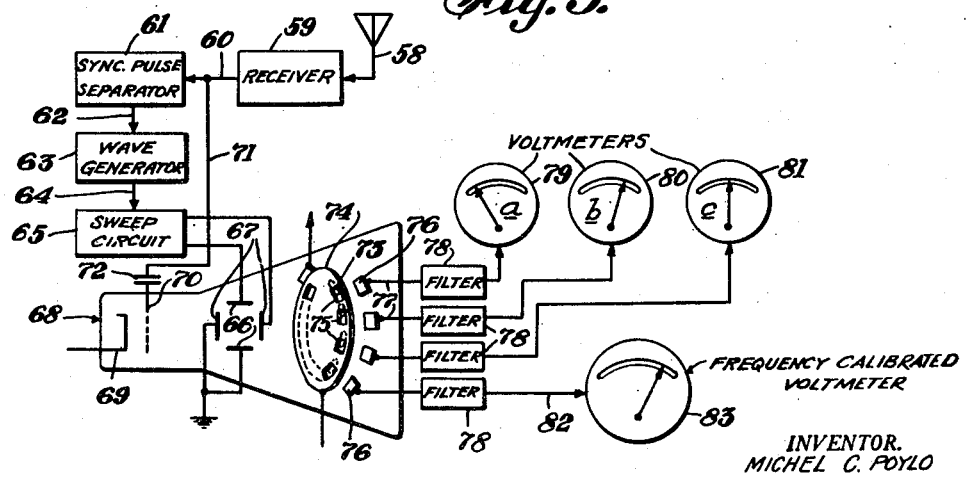
INVENTOR.
MICHEL C. POYLO
BY
*ATTORNEY*

Patented Oct. 10, 1950

2,524,832

UNITED STATES PATENT OFFICE 2,524,832

PULSE-TIME TELEMETERING SYSTEM

Michel C. Poylo, New York, N. Y., assignor to Federal Telecommunication Laboratories, Inc., New York, N. Y., a corporation of Delaware Application April 6, 1946, Serial No. 660,103

2 Claims. (Cl. 177—351)

This invention relates to a telemetering system. More particularly it deals with a telemetering system in which the intelligence from a plurality of different meters is simultaneously transmitted to one or a plurality of points by means of electronic distributor devices.

It is an object of this invention to transmit intelligence from meters to remote points in a novel and effective manner.

It is another object to transmit and receive intelligence from meters over a high frequency electromagnetic carrier wave.

It is another object to telemeter the intelligence from a plurality of meters continuously and simultaneously.

It is another object to telemeter the intelligence from a plurality of meters continuously and simultaneously by means of electronic distributor devices such as cathode ray tubes.

It is another object to telemeter the intelligence from a plurality of meters continuously and simultaneously over a single radio frequency wave band.

It is another object to telemeter the intelligence from meters by pulses of high repetition rate on an electromagnetic wave.

It is another object to telemeter intelligence from a plurality of meters continuously and simultaneously by means of time modulated pulses on an electromagnetic wave.

It is another object to telemeter intelligence from a plurality of different types of meters either mechanical or electrical or both continuously and simultaneously.

It is another object to telemeter intelligence from meters in vehicles which may be attended or unattended such as aircraft, weather balloons, missiles and the like, so that their speeds, temperatures, pressures and other conditions including location, altitude and the like, may be indicated at one or a plurality of points which may be either movable or fixed.

It is another object continuously and simultaneously to record intelligence from a plurality of meters which are located at a distant point, which point may be on a vehicle such as an airplane on a test flight. Thus, by means of this invention a complete record of the conditions within a plane may be recorded during a test flight until its termination, including termination by a crash resulting in the destruction of the instruments and meters on the plane and otherwise loss of their records.

Still other objects and features of this invention will appear from time to time in the description which follows.

Generally speaking the telemetering system of this invention comprises the following three essential steps:

(1) means to convert meter indications into corresponding changes in an electrical wave for modulation of pulses on an electromagnetic wave;

(2) means to transmit said pulses to a distant point; and (3) means to receive the modulated pulses and convert them to reproduce the indications of the original meter.

The first essential element, may comprise any suitable means for converting the indications of the meter or meters into corresponding changes in an electrical wave. In the case of an electrical meter, it may be directly coupled to the converting means for transmitting these changes. In the case of a mechanical meter, it may comprise means for following the needle or indicator of the meter and converting the motion thereof into electrical changes, or means coupled to a movable part of the meter for converting its motion into changes in an electrical wave. These changes may be changes in the amplitude of the voltage or current, or frequency, or the like. The resulting changes in electrical wave are then employed for controlling an electronic distributor which may comprise a cathode ray beam deflected by said electrical changes to produce correspondingly modulated pulses. These pulses may be modulated in amplitude, frequency, or time, the latter being preferred.

The second essential element of this system is the means for transmitting these resulting pulses over a suitable medium either directly, if their repetition rate is sufficiently high, or by modulation on an ultra-high frequency electromagnetic wave. These pulses may be transmitted by radio or through a coaxial cable or the like, as desired.

The third essential element of this system is the means for the reception of the modulated transmitted pulses and their demodulation for reproducing the indications of the original meter or meters. The received modulated pulses are demodulated in an electronic distributor device which may include a cathode ray beam, the deflection of which beam may be controlled by the pulses to reproduce corresponding changes in an electrical wave. These changes may then be applied to any well-known metering device, such as the voltmeter or a frequency meter (depending upon the types of changes produced in the electrical wave) for reproducing the indications of the original meters.

If a plurality of different types or similar meters are located at one point all of whose indications it is desired simultaneously and continuously to transmit to another point or points, separate trains of modulated pulses may be produced from each one of the meters and these trains may be interleaved on a single multichannel pulse wave, similar groups of pulses being separated by a synchronizing signal or pulse, and transmitted over a single ultra-high frequency carrier wave band. A single cathode ray electronic distributor device may be employed for modulating the changes in electrical waves from a plurality of different meters. Such a distributor device is disclosed in the copending applications of E. Labin and D. D. Grieg Serial No. 591,065, filed April 30, 1945, Patent No. 2,429,631, October 28, 1947, and Serial No. 567,414, filed December 9, 1944, Patent No. 2,495,738. Similarly, a single electronic distributor device may be used for the simultaneous separation and demodulation of the given trains of modulated pulses, corresponding to each of the meters, by deflection and synchronization of a cathode ray beam in a device of the type disclosed in the copending application of E. Labin and D. D. Grieg, Serial No. 565,152, filed November 25, 1944, now Patent No. 2,465,380, issued March 29, 1949.

By employing a relatively high repetition rate of pulses such as for example, about 8,000 pulses per second, a large number of different meter indications may be transmitted from each meter each second, thereby enabling the reproduction of a substantially continuous and simultaneous record of all of said meters. However, such a high pulse repetition rate is generally not necessary and a much lower repetition rate may be employed without visually changing the desired reproduced indications. Thus, the indications of a plurality of meters may be scanned many times each second to give a substantial continuous indication of all of these meters at any desired remote point. Some meters may require a different pulse repetition rate i. e. a wider frequency band for transmission of their indications than others. For example, changes in voltage may be transmitted at a much lower rate than changes in frequency, so that several indications from different meters producing changes in voltage amplitude may be transmitted while changes in frequency from one of the other types of meters are being transmitted. In such a case, separate cathode ray electronic switching devices of the type mentioned in the above patents may be multiplexed similarly to those shown and described in the copending application of E. Labin and D. D. Grieg, Serial No. 632,731, filed December 4, 1945.

These and other features and objects of this invention will become more apparent upon consideration of the following detailed description of an embodiment of this invention to be read in connection with the accompanying drawings, in which:

Fig. 1 is a schematic block wiring diagram of a telemeter transmitter station according to this invention;

Fig. 2 is a graph of wave-forms explaining the operation of Figs. 1 and 3: and

Fig. 3 is a schematic block wiring diagram of a telemeter receiver station according to this invention.

Although this invention may be applied to telemetering indications from a single meter, for the purpose of illustration, the following description is directed to a multi-channel telemetering system wherein the intelligence of several different types of meters is continuously and simultaneously transmitted and reproduced at a distant point.

Referring to Fig. 1, there is shown a plurality of meters 1, 2, 3 and 4, each of which is shown with a different type of means for converting their indications into corresponding changes in an electrical wave. Meter 1 is herein considered to be an electrical meter wherein the energy for operating the indicator thereon is electrical energy and may be directly withdrawn from the meter across a suitable resistance 5 through line 8 to the electronic distributor device 9 (described later). If the transmission station shown in Fig. 1 were on an airplane, the electrical meter 1 could be an electrical temperature gauge, gasoline gauge, carburetor-mixture temperature gauge, oil temperature gauge, an ammeter, a voltmeter, an electronic altimeter, an electric flap or landing gear position indicator, or the like. If desired any one or all of these gauges may be electrically connected to the device 9; each meter having reserved to it a separate communication channel, hereinafter referred to as channels $a$, $b$, $c$, $d$ ... $n$. These meters are shown identified with these channels both in the transmitting and receiving stations for the purposes of comparison.

Meters 2, 3 and 4 may be electrical meters also, or they may be mechanical meters, which, on an airplane, could be tachometers, air speed meters, barometric altimeters, artificial horizon gauges, gyro compasses, oil pressure gauges, fuel pressure gauges, or hydraulic flap and landing gear indicators, and the like.

The type of means shown for converting the movement of meter 2 is one which may be clamped onto the outside of the dial or cover glass of the meter 2 by a suitable means, such as a suction cup 10, having pivotally mounted thereon an arm 11 with an electromagnet 12 at the end thereof to follow the end of the pointer 13 of the meter 2. On the arm 11 is also an electric contact 14 which slides over an electrical resistance element 15 to change the amount of voltage drop through this element 15 in accordance with the position of the pointer or indicator on the meter 3. One end of this resistance being coupled to the battery 16, and the other end to contact 14 through flexible connection 17 and line 19 to the distributor device 9.

Meter 3 coupled to channel $c$, has mounted on the needle 20 thereof, a semi-crescent-shaped magnetic element 21 which moves longitudinally between the poles of an electromagnet 22, thereby changing the flux in this magnet and the current through the coil 23 of the magnet, corresponding to the width of the portion of the crescent-shaped conductor 21 which is inserted between the poles of the magnet 22. The circuit through the coil 23 is from battery 24 on the one side and through line 27 to the distributor device 9, on the other side.

The meter 4, corresponding to channel $d$, is coupled to convert its movements by variations in frequency of the electrical wave applied to the device 9. Herein, the indicator or needle 28 of the meter 4 has mounted thereon a semi-crescent-shaped conductor 29 (similar to 21 mentioned above) which moves longitudinally between a pair of coils 30 in a circuit with a condenser 31 which circuit is coupled through line 32 to an oscillator 33. The various positions of the needle 28 and corresponding various widths of the conductor 29 between the coils 30, changes the time constant of the circuit comprising coils 30 and condenser 31, thereby changing the frequency of the output of the oscillator 33. These variations in frequency are passed then through line 34 to a suitable transformer 35 (similar to 7) and thence through line 36 to the device 9.

Thus, as shown, the variations in the electrical waves applied from meters 1, 2, 3, through lines 8, 19 and 27 are amplitude variations of potential, while those through line 36 from meter 4 are frequency variations.

The particular electronic distributor device 9 described herein is known as a "Cyclodos" type of cathode ray tube. In this device, the sweep of the cathode ray beam around the target end of the tube is shown to be circular. This beam is formed at the cathode 37, controlled by grid 38 and caused to rotate by being deflected by the changes on the vertical and horizontal plates 39 and 40, respectively, coupled to the sweep circuit 41 energized by the base wave generator 42, such as a sine wave generator. In such a case, the sweep circuit 41 comprises means for producing two sine waves 90° out of phase with each other, one of which is applied to the vertical plate 39 and the other to the horizontal plate 40. Thus, the electron beam is caused to rotate around the segmenting plate 43 having apertures 44 therein which divide the beam up into segments. Aligned with each these segments are deflection plates 45, one corresponding to each signal channel. Deflecting plates 45 are arranged around a central electrode 46, the potentials between electrodes 45 and 46 being such that the changes in the electrical waves in the lines 8, 19, 27 and 36 will correspondingly cause the beam to be deflected radially proportionally to the magnitude of said changes. The resulting deflected segments of the beam impinge upon the target plate 47 having angularly disposed slots 48 therein, one slot corresponding to each of said plates 45 or channels $a, b, c, d \ldots n$. At the top of plate 47 there are a pair of slots 49 for which there is no corresponding deflection plate 45 adjacent the previous mentioned electrode 46. These slots 49 produce a pair of closely-spaced pulses which may be used as synchronizing pulses S, shown on the wave 50 in Fig. 2. The angularly displaced slots 48 are so shaped that they will cause the segments of the beam to be modulated in time with respect to the position of the synchronizing pulses S from slots 49 due to their deflection by means of the energy applied to the deflecting plates 45. Behind the aperture plate 47 is shown a collector electrode 51 from which the separate pulses of energy caused by the passage of the beam through the separate apertures in plate 47, are collected and passed through line 52 to a cathode-follower circuit 53. Thence these pulses, now as wave 50, are passed through line 54 to a suitable transmitter 55, which may be a radio transmitter coupled to an antenna 56.

Referring back to wave 50, it is seen that each one of the signal channels $a$, $b$, and $c$ (corresponding to the meters 1, 2 and 3) comprises pulses of energy which are time modulated in one direction with respect to the fixed position of the synchronizing pulses S on said wave. Pulse $d$, however, which is frequency modulated may be modulated in both directions. If desired, the synchronizing pulses S may be replaced by a single wide pulse or any other suitable shaped pulse to distinguish it from the time modulated pulses $a, b, c, d \ldots n$. The repetition rate of the synchronizing pulses S is identical with that of the rotation of the beam around the device 9, and with the frequency of the sine wave 57 generated in the base wave generator 42.

Referring now to a receiver station shown in Fig. 3, which is located at the point or at one of the points, where the indications of the meters are to be reproduced, there is provided an antenna 58 which is coupled to a suitable receiver 59 from which is withdrawn through line 60 a wave, similar to wave 50 in Fig. 2, which may be passed into a suitable synchronizing pulse separator circuit 61 for separating the synchronizing pulses S from the remaining pulses on the wave 50. The synchronizing pulse separator or selector circuit 61 may be a width selector circuit if the synchronizing pulse is a wide pulse, or it may be a circuit for superimposing and clipping the S pair of pulses on the wave 50 for producing a pulse wave in accordance with the disclosure in the copending application of D. D. Grieg, Serial No. 625,650, filed October 30, 1945, now Patent No. 2,485,591, issued October 25, 1949. The thus separated synchronizing pulses S may be passed from the separator 61 through line 62 into a suitable sine wave generator 63 which is coupled through line 64 to a sweep circuit 65 (similar to circuit 41) which in turn is coupled to the vertical and horizontal deflection plates 66 and 67, respectively, of the cathode ray electronic distributing device 68. This distributing device 68 is known as a "Cyclophon" and may be of the type described in the copending application of E. Labin and D. D. Grieg, Serial No. 565,152, filed November 25, 1944, now Patent 2,465,380, issued March 29, 1949. This particular cathode ray electronic distributor device 68 is provided with a cathode 69 for producing a beam of electrons which is cut off and on by applying to the grid 70 thereof the pulses of wave 50 through lines 60 and 71 and condenser 72 from receiver 59. The beam formed at the cathode 69 is rotated around the apertures 73 in the target plate 74 by means of two sine waves, similar to wave 57 but 90° out of phase with each other, which are applied to the plates 66 and 67. Since these waves are formed from the wave from generator 63 which in turn was formed from the synchronizing pulses S on wave 50, the rotation of the beam in device 68 is in synchronism with the rotation of the beam in device 9. Thus, the time when the beam is cut off and on by the time modulated pulses $a, b, c, d \ldots n$ causes the electrons in the beam segments to cover different areas 75 of the apertures 73 on the target 74. Behind each one of the apertures 73 are positioned separate target electrodes 76, one corresponding to each of the signal channels $a, b, c, d \ldots n$ and corresponding to each of the apertures 73 on plate 74. By covering different areas of said target electrodes 76, pulses of different amplitudes are derived dependent upon the amount of overlap of the electron beam of said electrodes. The combination of the plate 74 and the target 76 form an anode-dynode outputting arrangement which has the advantage of increasing the sensitivity over that which would be obtained if only separate target plates 76 were employed and shaped so that only the desired areas 75 of the segmented beams would fall on them. Connected to each of the targets 76 through line 77 are suitable filters 78 for integrating the output pulses and converting the resulting different amounts of electrons or amplitude demodulated pulses of energy into a comparatively low frequency wave for operating suitable indicators or meters for reproducing the indications of the original meters 1, 2, 3 and 4. The United States Patent No. 2,438,928 gives an example of how variable amplitude pulses may be converted into low frequency waves by means of simple low pass filters as outlined in the previous sentence hereof.

Corresponding to the meters 1, 2 and 3 from which is obtained amplitude energy in Fig. 1, there may be voltmeters 79, 80 and 81 having scales calibrated to indicate readings identical with said meters 1, 2 and 3. Since the energy over channel d is frequency modulated, the impulses received on target 76 corresponding thereto is also frequency modulated and may be passed through a filter 78 before it is passed through line 82 to a frequency meter 83, which may be calibrated for reproducing the identical readings of the meter 4 in Fig. 1. If desired, instead of the meters 79, 80, 81, and 83 there may be used recording meters for recording all of the indications of the meters 1, 2, 3 and 4 over a given period of time.

Similarly, many other meters may be placed over other channels and coupled through the electronic distributing devices 9 and 68 as described above.

While the above is a description of the principles of this invention in connection with specific apparatus and particular modifications thereof, it is to be clearly understood that this description is made only by way of example and not as a limitation on the scope of this invention as defined in the objects and the accompanying claims.

I claim:

1. Meteorological apparatus which comprises means for transmitting reference pulses several times each second at a fixed rate of repetition, means for transmitting intelligence signals between each pair of reference pulses, the time between a reference pulse and each succeeding intelligence signal being a function of a meteorological condition, a receiver for said pulses and signals, means associated with said receiver for continuously converting the elapsed time between said reference pulses and each intelligence signal into an electrical value proportional to the elapsed time, and means for continuously recording said value.

2. Meteorological apparatus which comprises means for transmitting reference pulses several times each second at a fixed rate of repetition, means for transmitting intelligence signals between each pair of reference pulses, the time between a reference pulse and each succeeding intelligence signal being a function of a meteorological condition, a receiver for said pulses and signals, means associated with said receiver for continuously converting the elapsed time between said reference pulses and each intelligence signal into a voltage value proportional to the elapsed time, and means for continuously recording said value.

MICHEL C. POYLO.

REFERENCES CITED

The following references are of record in the file of this patent:

UNITED STATES PATENTS

| Number | Name | Date |
| --- | --- | --- |
| 1,620,405 | Sprenger | Mar. 8, 1927 |
| 2,057,773 | Finch | Oct. 20, 1936 |
| 2,199,634 | Koch | May 7, 1940 |
| 2,378,395 | Dickson | June 19, 1945 |
| 2,381,920 | Miller | Aug. 14, 1945 |
| 2,400,170 | Silverman | May 14, 1946 |
| 2,403,890 | Johnson | July 9, 1946 |